UNITED STATES PATENT OFFICE.

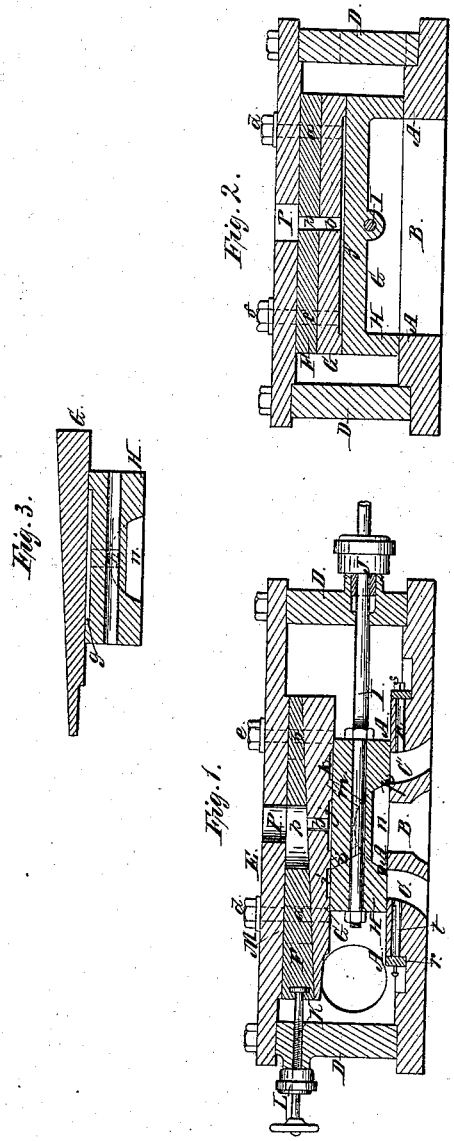

GEORGE RICHARDSON, OF SPRINGFIELD, MASSACHUSETTS.

IMPROVEMENT IN BALANCE SLIDE-VALVES.

Specification forming part of Letters Patent No. 36,857, dated November 4, 1862.

*To all whom it may concern:*

Be it known that I, GEORGE RICHARDSON, of Springfield, in the county of Hampden and Commonwealth of Massachusetts, have invented a new and useful Improvement in Slide-Valves for Steam-Engines; and I do hereby declare that the following is a full, clear, and exact description of the same, reference being had to the accompanying drawings.

My invention relates to that class of valves generally designated "balance slide-valves;" and the object of it is to produce a slide-valve which shall not receive the pressure of the steam on its back to force it down onto the valve-seat, and thereby produce an unnecessary amount of friction. The necessity of such an invention has so long been felt, and so many attempts have been made to produce it, that it is unnecessary for me to enlarge on that point, and I will proceed to describe my particular method, which has been applied to an engine and proved practically successful.

In the drawings making a part of this specification, Figure 1 is a longitudinal section of the steam-chest in the direction of the axis of the cylinder. Fig. 2 is a cross-section of the same. Fig. 3 is a view of the valve slightly varied from the one shown in Fig. 1.

The same letters indicate corresponding parts in each of the several figures.

A is the valve-seat, B the exhaust-port, and C C' the induction-ports, of the cylinder.

D D are the side walls of the steam-chest, and E the cover.

F and G are two wedge-shaped pieces; H, the valve; I, the valve-rod; J, the packing-box; K, a screw attached to wedge-shaped piece F, and L a packing-box for K. The back of the valve H is planed exactly parallel to the face. The wedge-piece G is exactly as long as the valve-seat. The wedge F is longer than G, and the two are planed to exactly the same angle, so that when the two pieces are placed together, as shown in the drawings, the top of F will be exactly parallel with the bottom of G. On the inside of the cover I make a slight projection, M, which is planed parallel to the valve-seat. Now, all of these several faces are ground together—*i. e.*, the top of F and the inside of the cover are ground together, so as to form a steam-joint. The two wedges are ground in the same manner; also, the lower side of G and the top of the valve, as well as the face of the valve and the valve-seat. Now the wedge-piece G is attached to the cover E by the bolts *a b c*, with the nuts *d e f* on the top of the cover. These bolts pass through holes in F, which are elongated in the direction of the axis of the cylinder, so as to allow F to be moved forward and back by the screw K. Thus, if the nuts *d e f* are turned so as to loosen the bolts, and then the screw K turned so as to force the wedge F forward until the several ground faces are held together with force enough to form steam-joints, and the whole securely confined by tightening the nuts in the bolts *a b c*, it is evident that as long as these joints remain steam-tight the steam cannot exert any pressure on the back of the valve; but in practice here arises another difficulty. In the sliding of the valve moisture must and will work in between the valve and G, and when in there it becomes converted into steam, and thus exerts a pressure on the valve. To avoid this, I make a slight recess either in the top of the valve or bottom of G, and connect this recess with the atmosphere outside the steam-chest by holes through the cover and two wedge-pieces, or with the exhaust-passage by a hole through the valve.

As shown in Fig. 3, (which is a longitudinal section of a valve and wedge G detached,) the recess *g* is formed in the top of the valve and connected with the exhaust-passage by the hole *h* through the valve. Now this arrangement, in connection with the wedges F and G, serves to relieve the valve of any pressure of steam on the back, and thus in most cases makes a very effective and useful balance-valve; but in some kinds of engines the back-pressure—*i. e.*, the pressure of the exhaust-steam on the bottom of the valve—amounts to a considerable item. To overcome this pressure, as well as the direct pressure of the steam, I construct the valve and wedge G as shown in Fig. 1, in which *i j k* are three recesses in the lower face of G, said recesses corresponding exactly or very nearly in size and position with the ports B C C' in the valve-seat.

*l m* are two ports or holes opening from the exhaust-cavity *n* in the valve through the back of the valve. Now, the holes *l m* intersect the back surface of the valve in such a position that the outer edges of the holes—that is, the edges farthest from the center of the valve—are directly opposite or above the edges

*o p* of the exhaust-cavity *n*. Now, when the valve has moved so as allow the cylinder to commence to exhaust at the port C', the hole *m* at the same time begins to open into the recess K, and, producing a pressure on the back, serves to balance an equal amount of pressure on the lower side of the valve, thus making very nearly a balance-valve in all respects.

The opening P from the central recess, *j*, through the wedges and cover serves as a telltale to enable the engineer to see when the valve is leaking steam. A pipe may be inserted in the cover and carried round into the exhaust-pipe to avoid the unpleasant leaking of water and steam. In this case a stop-cock or valve would be inserted, by opening which the engineer could judge of the condition of the valve. Thus, if it had become worn so as to leak steam, he would unscrew the nuts *d e f*, turn the screw K a little in the direction to force the wedge F forward, then tighten up the nuts, and go on.

*r s* are two valves closing small ports *t u*, leading from the ports C C' into the steam-chest for the purpose of allowing any water that may be in the cylinder to escape into the steam-chest when the valve H closes the ports C C'.

The wedge F may be made of brass to prevent corroding, so as to render it difficult to move it by the screw K. Thus it is seen that the wedges F and G form a complete protection for the back of the valve from the pressure of the steam, and at the same time one that can be adjusted in a very simple manner as the valve wears.

Now, having fully described the construction and operation of my invention, what I claim as new, and desire to secure by Letters Patent, is—

1. The combination of the valve H, wedges F and G, and steam-chest cover E, when severally constructed and operating substantially in the manner and for the purposes herein set forth.

2. The combination of the sliding valve H, having the ports *l m*, situated as herein described, with the recesses *i* and *k* in an adjustable piece, G, when operating substantially in the manner and for the purpose herein set forth.

GEORGE RICHARDSON.

Witnesses:
J. R. SMITH,
MILTON BRADLEY.